(12) United States Patent
Ponnekanti

(10) Patent No.: US 6,606,626 B1
(45) Date of Patent: Aug. 12, 2003

(54) DATABASE SYSTEM WITH LOCK MANAGER ENHANCEMENT FOR IMPROVING CONCURRENCY

(75) Inventor: Nagavamsi Ponnekanti, Emeryville, CA (US)

(73) Assignee: Sybase, Inc., Dublin, CA (US)

( * ) Notice: Subject to any disclaimer, the term of this patent is extended or adjusted under 35 U.S.C. 154(b) by 0 days.

(21) Appl. No.: 09/502,977

(22) Filed: Feb. 11, 2000

Related U.S. Application Data

(63) Continuation-in-part of application No. 09/364,981, filed on Jul. 31, 1999, now Pat. No. 6,363,387.
(60) Provisional application No. 60/125,303, filed on Mar. 19, 1999, and provisional application No. 60/105,047, filed on Oct. 20, 1998.

(51) Int. Cl.[7] .............................................. G06F 17/30
(52) U.S. Cl. ............................ 707/8; 707/10; 707/100; 707/201; 709/203
(58) Field of Search ............................ 707/8, 10, 100, 707/201; 709/203

(56) References Cited

U.S. PATENT DOCUMENTS

| | | | |
|---|---|---|---|
| 4,606,002 A | 8/1986 | Waisman et al. ............... 707/3 |
| 4,677,550 A | 6/1987 | Ferguson ........................ 707/3 |
| 4,791,561 A | 12/1988 | Huber ............................ 707/1 |
| 4,805,099 A | 2/1989 | Huber ........................ 707/102 |
| 4,947,320 A * | 8/1990 | Crus et al. .................. 707/201 |
| 4,967,341 A | 10/1990 | Yamamoto et al. ............ 707/2 |
| 5,089,952 A | 2/1992 | Bozman ...................... 710/200 |
| 5,115,392 A | 5/1992 | Takamoto et al. .......... 709/101 |
| 5,123,104 A | 6/1992 | Levine et al. .................. 707/1 |
| 5,163,148 A | 11/1992 | Walls ......................... 707/204 |
| 5,204,958 A | 4/1993 | Cheng et al. ............... 707/102 |
| 5,265,244 A | 11/1993 | Ghosh et al. ................... 707/1 |
| 5,386,557 A | 1/1995 | Boykin et al. ................. 707/1 |
| 5,430,869 A | 7/1995 | Ishak et al. .................. 707/100 |
| 5,493,728 A | 2/1996 | Solton et al. ................ 711/113 |
| 5,504,888 A | 4/1996 | Iwamoto et al. ............ 707/200 |
| 5,555,389 A | 9/1996 | Satoh et al. ................ 711/100 |
| 5,630,124 A * | 5/1997 | Coyle, Jr. et al. ....... 707/103 R |
| 5,721,909 A | 2/1998 | Oulid-Aissa et al. ......... 707/10 |
| 5,758,356 A * | 5/1998 | Hara et al. .................. 707/202 |
| 5,794,241 A * | 8/1998 | Loaiza ........................... 707/8 |
| 5,835,757 A | 11/1998 | Oulid-Aissa et al. ......... 707/10 |
| 5,842,196 A * | 11/1998 | Agarwal et al. ............... 707/2 |
| 5,884,327 A | 3/1999 | Cotner et al. ............... 707/202 |
| 5,983,225 A | 11/1999 | Anfindsen ...................... 707/8 |
| 6,052,695 A | 4/2000 | Abe et al. .................... 707/202 |
| 6,112,209 A | 8/2000 | Gusack ....................... 707/101 |

* cited by examiner

Primary Examiner—John Breene
Assistant Examiner—Cheryl Lewis
(74) Attorney, Agent, or Firm—John A. Smart

(57) ABSTRACT

A Client/Server Database System with an enhanced Lock Manager for improving concurrency is described. The system tracks information about database columns that are updated in the Lock Manager, in addition to the exclusive lock on the data row (in case of data row locking) or data page (in case of data page locking). In particular, a new field, lrcolumns, is added to the system's record lock data structure to track which columns have been modified. When an exclusive lock is requested on a row of the table being updated in the update statement, the Lock Manager sets the value of lrcolumns. In the context of an exclusive lock that was acquired to update one or more columns of a data row, if an exclusive lock was used only to insert or delete (but not update) the data row, the lrcolumns field would be set to 0. Similarly, the lrcolumns field is 0 for locks that are not exclusive locks (e.g., shared locks). With the Lock Manager enhancement of storing information about updated columns, scan (i.e., database scan operation) can skip a row (i.e., does not block for a lock on the row) if at least one of the sargs that the row does not qualify is on a column that was not updated by the updater. The approach avoids a lot of unnecessary blocking, thereby improving concurrency significantly.

30 Claims, 7 Drawing Sheets

DATABASE SYSTEM WITH LOCK MANAGER ENHANCEMENT FOR IMPROVING CONCURRENCY

RELATED APPLICATIONS

The present application claims the benefit of priority from and is related to the following commonly-owned U.S. provisional applications: application serial No. 60/125,303, filed Mar. 19, 1999 and Ser No. 60/105,047 filed Oct. 20, 1998. Further, the present application claims the benefit of priority from and is a continuation-in-part application of the following commonly-owned application: application Ser. No. 09/364,981, U.S. Pat. No. 6,363,387B1, filed Jul. 31, 1999. The disclosures of the foregoing applications are hereby incorporated by reference in their entirety, including any appendices or attachments thereof, for all purposes.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates generally to information processing environments and, more particularly, to computer-implemented methodologies for enhancing concurrent access in a data processing system, such as a Database Management System (DBMS).

Computers are very powerful tools for storing and providing access to vast amounts of information. Computer databases are a common mechanism for storing information on computer systems while providing easy access to users. A typical database is an organized collection of related information stored as "records" having "fields" of information. As an example, a database of employees may have a record for each employee where each record contains fields designating specifics about the employee, such as name, home address, salary, and the like.

Between the actual physical database itself (i.e., the data actually stored on a storage device) and the users of the system, a database management system or DBMS is typically provided as a software cushion or layer. In essence, the DBMS shields the database user from knowing or even caring about underlying hardware-level details. Typically, all requests from users for access to the data are processed by the DBMS. For example, information may be added or removed from data files, information retrieved from or updated in such files, and so forth, all without user knowledge of underlying system implementation. In this manner, the DBMS provides users with a conceptual view of the database that is removed from the hardware level. The general construction and operation of a database management system is known in the art. See e.g., Date, C., *An Introduction to Database Systems*, Volume I and II, Addison Wesley, 1990; the disclosure of which is hereby incorporated by reference.

DBMS systems have long since moved from a centralized mainframe environment to a de-centralized or distributed environment. One or more PC "client" systems, for instance, may be connected via a network to one or more server-based database systems (SQL database server). Commercial examples of these "client/server" systems include Powersoft™ clients connected to one or more Sybase Adaptive Server™ database servers. Both Powersoft™ and Sybase Adaptive Server™ (formerly Sybase SQL Server™) are available from Sybase, Inc. of Emeryville, Calif.

To support multiple clients concurrently accessing data, a database system must employ some sort of concurrency control. Concurrency control is the way that a database synchronizes clients' or users' access to data to ensure that they do not destroy each other's work. Locking is the way that most databases handle concurrency control. While one user has a lock on a subset of the database, that data is "blocked" or protected from other users' attempts to make changes to it. One user's changes have to be "committed" before another user can see or further change the same data.

One of the characteristics of a locking scheme is the level of the locks. Some products default to physical storage page-level locks, while others default to logical row-level locks. Some products allow the user to specify which level of locking (page, row, or table) will be used for an individual table. Another of the characteristics of a locking scheme is the lock type, whether dynamic or static. A static locking scheme sets up one level of locking for each table in the database, often at table creation time or via database defaults. Dynamic locking attempts to optimize the granularity of locks depending on the particular change being made. A dynamic locking scheme will automatically increase the granularity of locks from row to page to table level when a certain threshold is met in the more fine-grained locks. The goal is to use the least amount of system overhead per lock while getting as many users safely into the database as possible. The usual approach is to start with a higher level lock, then reduce its granularity only when there is contention from another transaction that wants to lock the same page or table for an UPDATE, DELETE, INSERT, or SELECT operation. This minimizes the total number of locks.

The approach of initially using a lower granularity and escalating it when a threshold level is reached has problems. For example, escalation from row-level to page-level locks can cause deadlocks when two transactions attempt to acquire page-level locks on the same page at the same time. Page-level locking is particularly problematic for highly-concurrent data structures whose structures must be maintained, such as B-tree data structures. Conventionally, when two different transactions are attempting to insert into the same B-tree page, for instance, the underlying system employs transaction durational page-level locks, so that the two competing inserts would be serialized. If enough room does not exist for the inserts, the page is split. A split in one part of the tree does not occur in isolation but propagates to its parent. Often, the split is done as a separate action—a "nested top" action—within the transaction. After the split is completed, the system continues with the current transaction. If two transactions are trying to perform splits at different locations in the B-tree in a conventional system, the transactions are serialized, as a conventional system only allows one top action at a time. The process of serializing page splits leads to much contention among the multiple transactions concurrently executing within the system.

Each day more and more businesses are run from mission-critical systems which store information on server-based SQL database systems, such as Sybase Adaptive Server™. As a result, increasingly higher demands are being placed on server-based SQL database systems to provide enterprise-wide decision support. Since reducing the time required for processing queries substantially impacts system performance, it is highly desirable to optimize query processing. Without further optimization, processing of a query in real-time can be particularly burdensome, especially since a relatively high number of computations and possibly disk or network input/output operations must be performed in order to evaluate each row of the table or tables under examination. Accordingly, there is much interest in improving the performance of such tasks, particularly in terms of execution speed and reliability.

SUMMARY OF THE INVENTION

The present invention comprises a Client/Server Database System with improved methods for enhancing concurrency using a "row update" bit and deferred locking. In an exemplary embodiment, the system includes one or more Clients (e.g., Terminals or PCs) connected via a Network to a Server. The Server, operating under a server operating system (e.g., UNIX), includes a Database Server System, such as Sybase Adaptive Server™. In general operation, Clients store data in and retrieve data from one or more database tables resident on the Server by submitting SQL commands, some of which specify "queries"—criteria for selecting records of a table for a particular operation (e.g., updating). Queries are typically provided using a data manipulation language (DML), such as using the well-known SQL syntax.

The present invention introduces a methodology for using a "row update" (ROW_UPDATE) bit and deferred locking techniques that reduce locking overhead and increase concurrency, during database operations requiring access (e.g., query processing). Each data row employs ROW_DELETE and ROW_UPDATE status bits (flags or indicators). When a transaction updates a row, it sets the ROW_UPDATE bit. When a transaction inserts a row, neither the ROW_UPDATE nor the ROW_DELETE status bits are set. When a transaction deletes a row, it sets the ROW_DELETE bit but the contents of the data row are left intact. Note that if a row gets updated and then deleted, it will have both its ROW_UPDATE and ROW_DELETE status bits set. When an insert (operation) rolls back, it sets the ROW_DELETE bit. When a delete rolls back, it clears the ROW_DELETE bit. When an update (operation) rolls back, it restores the old image of the row, and thus the row gets whatever status bits that existed in the old image.

The ROW_UPDATE and ROW_DELETE bits are cleaned up as follows. When a scan requests a lock on a row with ROW_UPDATE bit set and gets LOCK_GRANTED status from the Lock Manager, it means that the transaction which set the ROW_UPDATE bit has completed and so the ROW_UPDATE bit can be cleared. Similarly a row with ROW_DELETE bit set can be removed from the page if it is determined that the deleting transaction has completed.

The basic approach or methodology adopted for table scans is as follows. The action taken by a scan depends on whether the row qualifies and the status of the row status bits. Qualification is done while holding a latch. First, the method examines the status (bits) of the data row under consideration (for locking). Four possible combinations exist: unset, delete, update, and update/delete. In the case that the status bits are not set (i.e., "unset"), the method proceeds to determine whether the data qualifies (i.e., the scan criterion). If the data qualifies ("yes" case), the method proceeds to grant the lock (request) and return the data row. If, however, the data does not qualify ("no" case), the row is instead skipped, as the row will never qualify.

In the case that the status is "delete" (i.e., only the "delete" status bit is set), the method proceeds to determine whether the data qualifies. If the data qualifies, the method proceeds to process a request for an instant duration lock ("lock instant"). The instant duration lock is a mechanism that allows the client (requesting the lock) to see whether there exists a conflicting lock already held on the row (i.e., from another concurrent transaction). If no conflict is found, the "lock instant" request will be granted and the client will know that the "delete" has committed. Accordingly, the row may be skipped as the row is "deleted" (and that deletion has been committed). If a conflicting lock exists, however, the "lock instant" request will fail. Here, it is possible that the "delete" may in fact roll back (as a result of the roll back of another concurrent transaction). Accordingly, the client will instead block (i.e., sleep on the lock—a waiting for the lock to be granted) so that a rollback of the "delete" may be detected. On the other and, if the data does not qualify ("no" case), the method may proceed to skip the row as it will never qualify (even if the "delete" rolls back).

In the case that the status is "update" (i.e., only the "update" status bit is set), the method proceeds to determine whether the data qualifies. If the data qualifies ("yes"), the method proceeds to grant the lock and return the row. If the data does not qualify ("no" case), then a instant duration lock is requested. As was previously discussed above, the "lock instant" request serves as a shortcut method for determining whether the "update" has committed and, if not, for sleeping on the lock until the lock may be granted. If the "update" has committed (i.e., the "lock instant" request can be granted), the row is skipped (since, recall, the data does not qualify the scan criterion). Finally, it is possible that both "update" and "delete" (i.e., both the "update" and "delete" status bits) are set. Regardless of whether the data qualifies, the method will process a "lock instant" request/skip action, in a manner similar to that previously described.

Deferred locking is a technique where the Index Manager returns record IDs (RIDs) to the Data Layer without acquiring locks on them during scans that have scan arguments (SARGS) on columns not in the index; the Data Layer subsequently qualifies the data row and determines whether locking is really necessary. Conventionally, in index scans, locking is done in the Index Manager (based only on whether the index row qualifies). However, in accordance with the present invention, the locking is done after reading the data row, taking into account the status bits of data row and whether the data row qualifies. This optimization is performed when there are some qualification conditions on columns but not in the index.

The Index Manager qualifies index rows. It qualifies both the rows with and without the ROW_DELETE bit set. Rows that do not satisfy SARGS on index columns are discarded. If a qualifying row does not have its ROW_DELETE bit set, the RID from it is returned to the Data Layer. On the other hand, if the qualifying row has its ROW_DELETE bit set, an instant lock is acquired on it to see if the deleting transaction has committed. If the lock is granted (i.e., Lock Manager returns LOCK_GRANTED or LOCK_NOTNEEDED), the row is discarded. Otherwise, RID from the row is returned to the Data Layer.

The Lock Manager may be further enhanced for improving concurrency by tracking the columns that are updated in the Lock Manager, in addition to tracking the exclusive lock on the data row (in case of data row locking) or data page (in case of data page locking). A new field, lrcolumns, is added to the system's record lock data structure to track which columns have been modified. To track 32 columns, for instance, a 32-bit field may be employed. When an exclusive lock is requested on a row of the table being updated in the update statement, the Lock Manager sets the value of lrcolumns. In the context of an exclusive lock that was acquired to update one or more columns of a data row, if an exclusive lock was used only to insert or delete (but not update) the data row, the lrcolumns field would be set to 0. Similarly, the lrcolumns field is 0 for locks that are not exclusive locks (e.g., shared locks).

With the Lock Manager enhancement of storing information about updated columns, scan skips the row (i.e., does not block for a lock on the row) if at least one of the sargs that the row does not qualify is on a column that was not updated by the updater. The following logic determines if the row can be skipped without blocking and it is executed when conditional lock request fails.

```
if row has ROW_UPDATE bit set and did not qualify then
{
    l=conflicting lock returned by the lock manager
/* Requalify the row but consider ONLY sargs on columns
    that were not
** updated by the updater(i.e., a sarg on column x is not
    considered if
** column id for column x is greater than 32 or if the bit
    corresponding
** the column id is set in lrcolumns).
*/
    for each sarg s of the scan
    {
        id=column id of the column referred in the sarg s
        if (id<=32) and (bit position corresponding to id is not
            set in lrcolumns)
        {
        /* it is certain that the column involved in this sarg was
            not
        ** updated by the updater
        */
            if the row does not satisfy this sarg
            {
            /* if we come here, there is no need to block. move on to
                next row
            */
                goto next_row
            }
        }
    }
    else
    {
        /*
        ** This column may have been updated by the updater. So
            the
        ** requalification does not consider this sarg (i.e., it
            behaves as if this
        ** sarg does not exist).
        */
        }
    }
}
/* if we come here, block */
/* . . . code for blocking . . . */
```

Now consider when the data row has ROW_UPDATE (or both ROW_UPDATE and ROW_DELETE) status bit set, a scan requests an instant duration lock and if the lock cannot be granted, the scan blocks for the lock. With the Lock Manager enhancement of storing information about updated columns, the behavior is the same if the row qualifies (i.e., if it satisfies all sargs). However, the scan skips the row (i.e., does not block for a lock on the row) if at least one of the sargs that did not qualify is on a column that was not updated by the updater. The same logic as shown above can be used to determine if it is necessary to block when a conditional lock request fails.

DETAILED DESCRIPTION OF A PREFERRED EMBODIMENT

The following description will focus on the presently preferred embodiment of the present invention, which is operative in a network environment executing client/server database applications. The present invention, however, is not limited to any particular application or environment. Instead, those skilled in the art will find that the present invention may be advantageously applied to any application or environment where optimization of query performance is desirable, including non-SQL database management systems and the like. The description of the exemplary embodiments which follows is, therefore, for the purpose of illustration and not limitation.

I. Standalone System Hardware

Figure 1A:
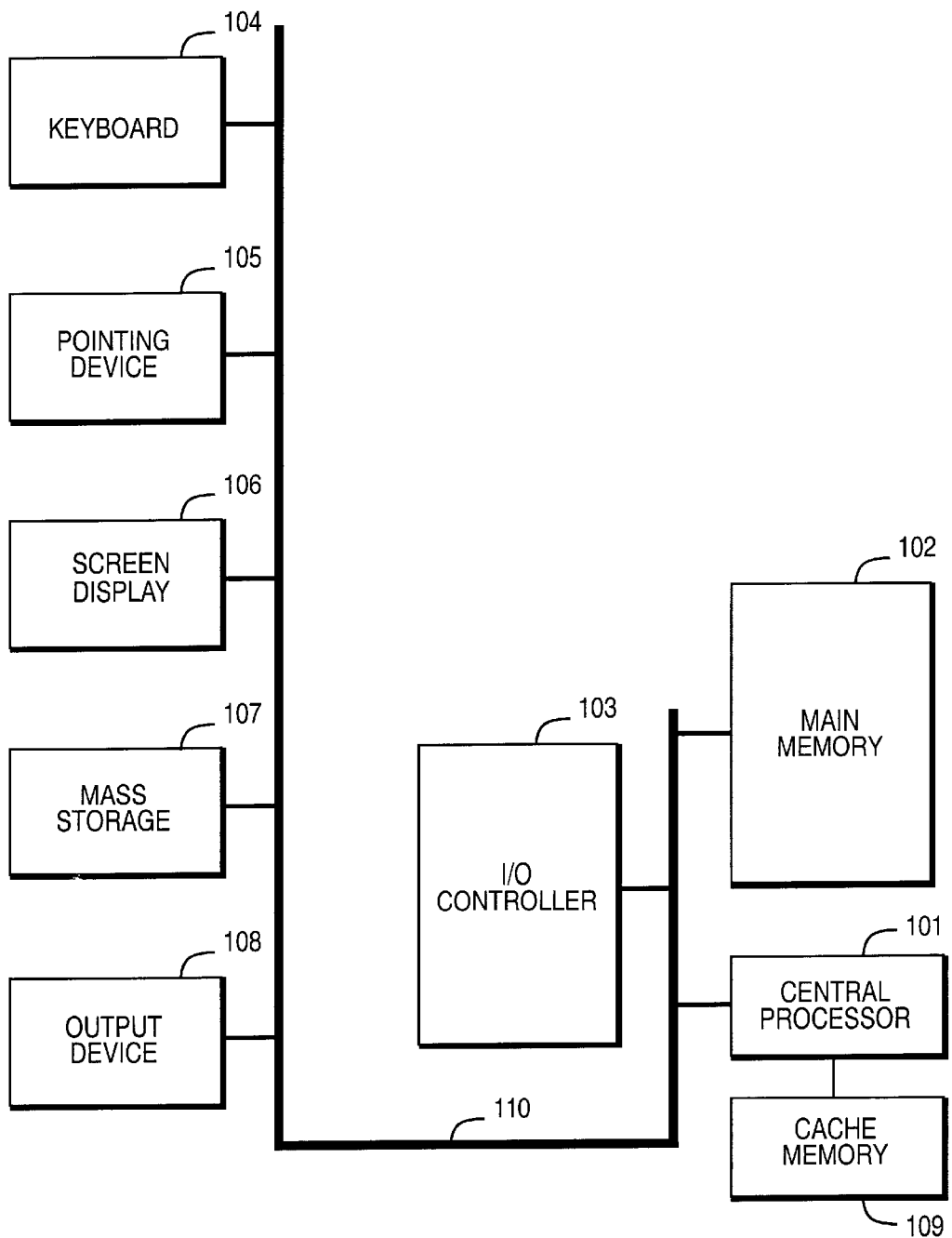
FIG. 1A is a block diagram illustrating a computer system in which the present invention may be embodied.

The invention may be embodied on a computer system such as the system 100 of FIG. 1A, which comprises a central processor 101, a main memory 102, an input/output controller 103, a keyboard 104, a pointing device 105 (e.g., mouse, track ball, pen device, or the like), a screen display device 106, and a persistent or mass storage 107 (e.g., hard or fixed disk, removable or floppy disk, optical disk, magneto-optical disk, and/or flash memory). Processor 101 includes or is coupled to a cache memory 109 for storing frequently accessed information; memory 109 may be an on-chip cache or external cache (as shown). Additional output device(s) 108, such as a printing device, may be included in the system 100 as desired. As shown, the various components of the system 100 communicate through a system bus 110 or similar architecture. In a preferred embodiment, the system 100 includes an IBM-compatible personal computer system, available from a variety of vendors (including IBM of Armonk, N.Y.).

II. Standalone System Software

Figure 1B:
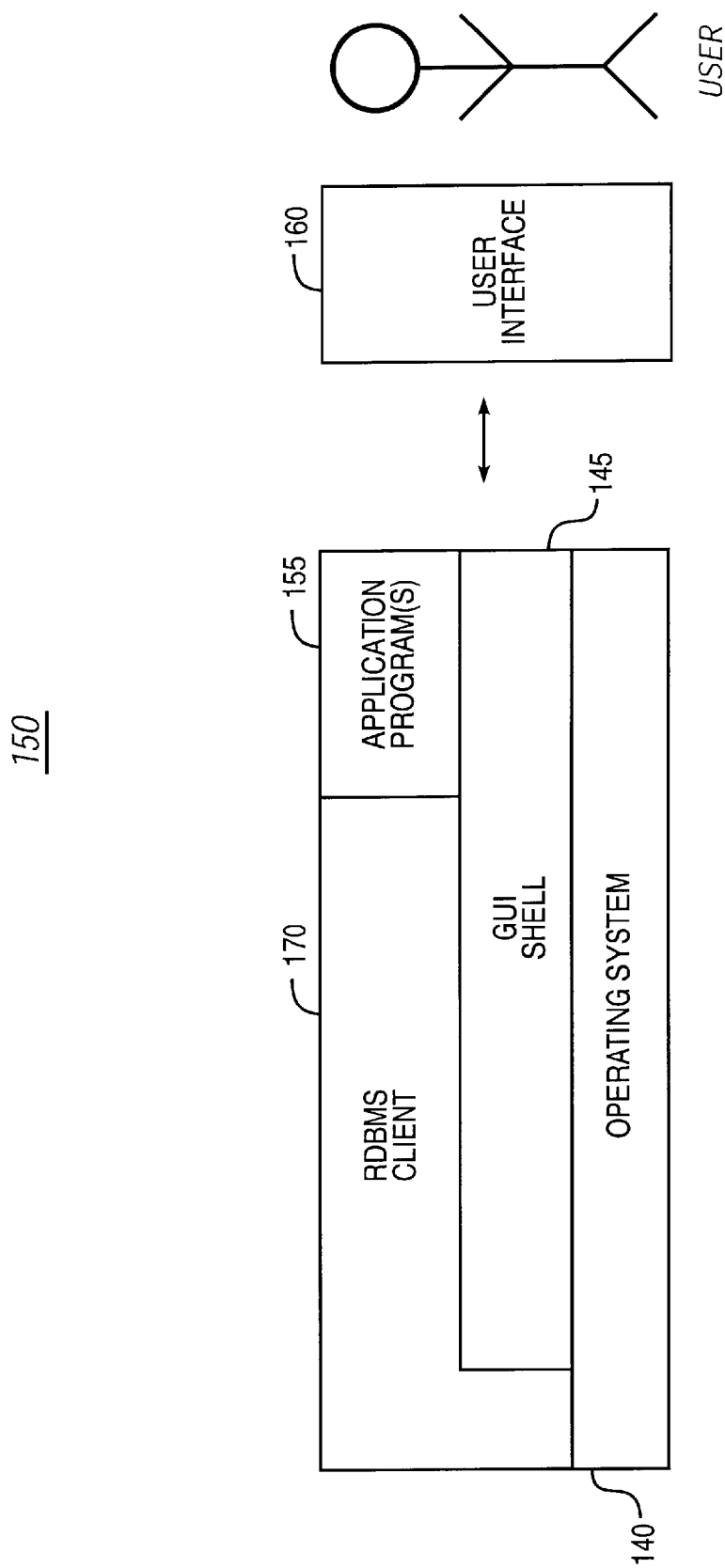
FIG. 1B is a block diagram illustrating a software subsystem for controlling the operation of the computer system of FIG. 1A.

Illustrated in FIG. 1B, a computer software system 150 is provided for directing the operation of the computer system 100. Software system 150, which is stored in system memory 102 and on disk memory 107, includes a kernel or operating system (OS) 140 and a GUI (graphical user interface) shell 145. One or more application programs, such as application software 155, may be "loaded" (i.e., transferred from storage 107 into memory 102) for execution by the system 100. The system also includes a UI (user interface) 160 for receiving user commands as input and displaying user data as output. Although shown as a separate component, the UI 160 is typically provided by the GUI operating under the control of the OS 140, program(s) 155, and Relational Database Management System (RDBMS) client 170. The RDBMS client or "front-end" 170 itself may comprise any one of a number of database front-ends, including PowerBuilder™, dBASE®, Paradox®, Microsoft® Access, or the like. In an exemplary embodiment, the front-end will include SQL access drivers (e.g., Borland SQL Links, or Microsoft ODBC drivers) for accessing SQL database server tables in a Client/Server environment.

III. Client/Server Database Management System

Figure 2A:
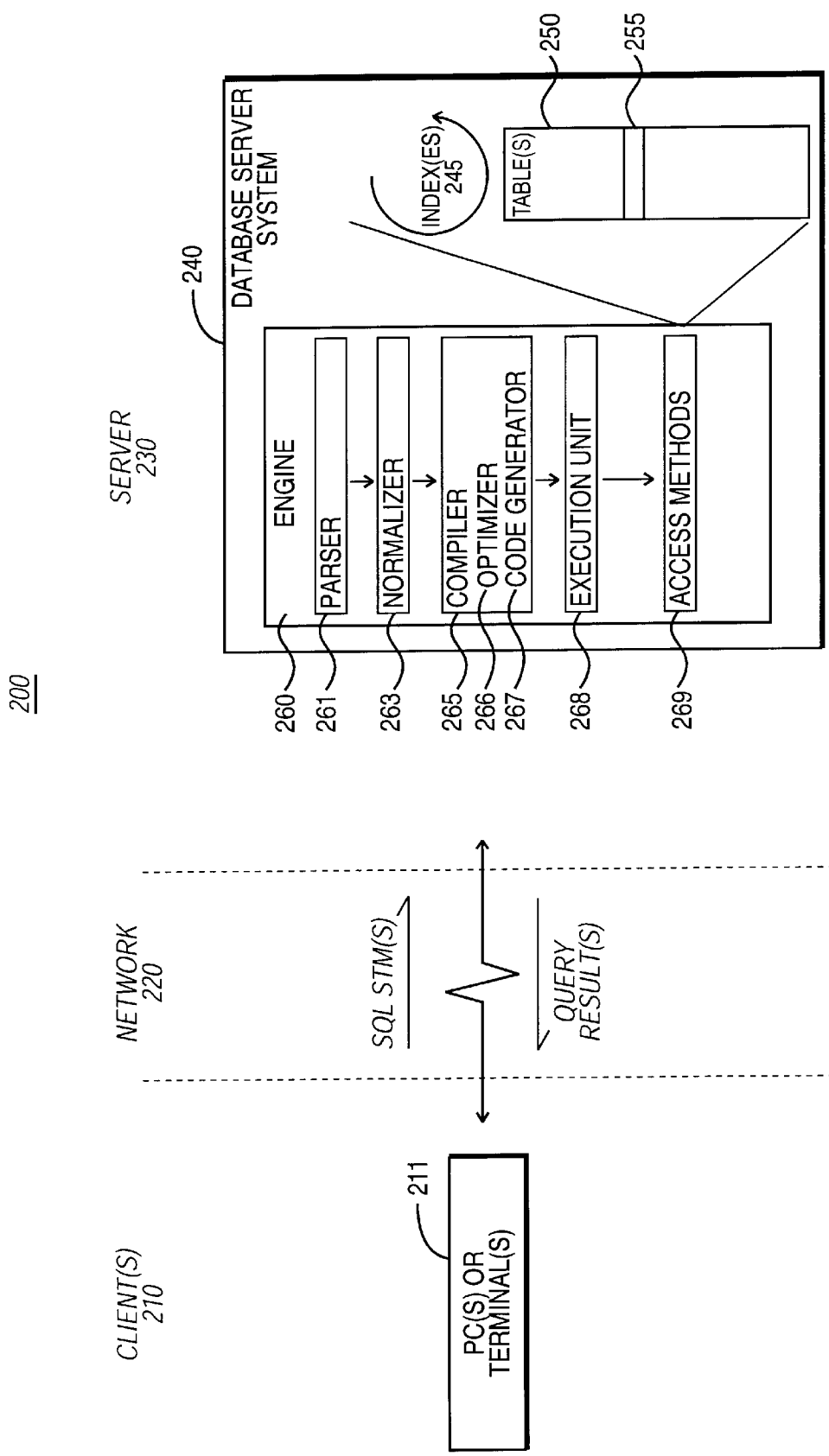
FIG. 2A is a block diagram of a client/server system in which the present invention is preferably embodied.

While the present invention may operate within a single (standalone) computer (e.g., system 100 of FIG. 1A), the present invention is preferably embodied in a multi-user computer system, such as a client/server system. FIG. 2A illustrates the general structure of a Client/Server Database System 200 which is preferred for implementing the present invention. As shown, the system 200 comprises one or more Client(s) 210 connected to a Server 230 via a Network 220. Specifically, the Client(s) 210 comprise one or more standalone Terminals 211 connected to a Database Server System 240 using a conventional network. In an exemplary embodiment, the Terminals 211 may themselves comprise a plurality of standalone workstations, dumb terminals, or the like, or comprise personal computers (PCs) such as the above-described system 100. Typically, such units would operate under a client operating system, such as Microsoft Windows/MS-DOS for PC clients.

The Database Server System 240, which comprises Sybase SQL Server™ (Sybase, Inc. of Emeryville, Calif.) in an exemplary embodiment, generally operates as an independent process (i.e., independently of the clients) running under a server operating system such as Microsoft Windows NT (Microsoft Corp. of Redmond, Wash.), NetWare (Novell of Provo, Utah), or UNIX (Novell). The Network 220 may be any one of a number of conventional network systems, including a Local Area Network (LAN) or Wide Area Network (WAN), as is known in the art (e.g., using Ethernet, IBM Token Ring, or the like). The Network includes functionality for packaging client SQL calls and its parameters into a format (of one or more packets) suitable for transmission across a cable or wire, for delivery to the Database Server 240.

Client/server environments, database servers, and networks are well documented in the technical, trade, and patent literature. For a general discussion of database servers and client/server environments, see, e.g., Nath, A., *The Guide to SQL Server*, Second Edition, Addison-Wesley Publishing Company, 1995. For a discussion of a computer network employing Microsoft Networks/OpenNet File Sharing Protocol, see Method and System for Opportunistic Locking in a Networked Computer System, Intl. Application No. PCT/US90/04570, Intl. Publication No. WO 91/03024, Intl. Publication Date Mar. 7, 1991. For a general introduction to a Local Area Network operating under NetWare, see Freed, L. et al., *PC Magazine Guide to Using NetWare*, Ziff-Davis Press, 1991. A more detailed discussion is available in NetWare 3.x and 4.x and accompanying documentation, which is available from Novell of Provo, Utah. The disclosures of each of the foregoing are hereby incorporated by reference.

In operation, the Client(s) 210 store data in or retrieve data from one or more database tables 250, shown in FIG. 2A. Typically resident on the Server 230, each table itself comprises one or more horizontal rows or "records" (tuples) together with vertical columns or "fields." A database record includes information which is most conveniently represented as a single unit. A record for an employee, for example, may include information about the employee's ID Number, Last Name and First Initial, Position, Date Hired, Social Security Number, and Salary. Thus, a typical record includes several categories of information about an individual person, place, or thing. Each of these categories, in turn, represents a database field. In the foregoing EMPLOYEE table, for example, Position is one field, Date Hired is another, and so on. With this format, tables are easy for users to understand and use. Moreover, the flexibility of tables permits a user to define relationships between various items of data, as needed.

During a database session or "connection" with the Server, each Client issues one or more SQL commands to the Server. SQL commands may specify, for instance, a query for retrieving particular data (i.e., data records meeting the query condition) from the table 250. The syntax of SQL (Structured Query Language) is well documented; see, e.g., the abovementioned *An Introduction to Database Systems*. In addition to retrieving the data from Database Server tables, the Clients also include the ability to insert new rows of data records into the table; Clients can also modify and/or delete existing records in the table.

During system operation, the SQL statements received from the one or more Clients 210 (via Network 220) are processed by Engine 260 of the Database Server System 240. The Engine 260 itself comprises a Parser 261, Normalizer 263, Compiler 265, Execution Unit 268, and Access Methods 269. Specifically, the SQL statements are passed to the Parser 261 which converts the statements into a query tree—a binary tree data structure which represents the components of the query in a format selected for the convenience of the system. In this regard, the Parser 261 employs conventional parsing methodology (e.g., recursive descent parsing).

The query tree is normalized by the Normalizer 263. Normalization includes, for example, the elimination of redundant data. Additionally, the Normalizer performs error checking, such as confirming that table names and column names which appear in the query are valid (e.g., are available and belong together). Finally, the Normalizer can also look up any referential integrity constraints which exist and add those to the query.

After normalization, the query tree is passed to the Compiler 265, which includes an Optimizer 266 and a Code Generator 267. The Optimizer is responsible for optimizing the query tree. The Optimizer performs a cost-based analysis for formulating a query execution plan. The Optimizer will, for instance, select the join order of tables (e.g., when working with more than one table); it will select relevant indexes (e.g., when indexes are available). The Optimizer, therefore, performs an analysis of the query and picks the best execution plan, which in turn results in particular ones of the Access Methods being invoked during query execution.

The Code Generator 267, on the other hand, converts the query tree into a set of instructions suitable for satisfying the query. These instructions are passed to the Execution Unit 268. Operating under the control of these instructions, the Execution Unit 268 generates calls into lower-level routines, such as the Access Methods 269, for carrying out the query-specified operation, such as fetching relevant information (e.g., row 255) from the database table 250. After the plan has been executed by the Execution Unit, the Server returns a query result or answer table back to the Client(s).

For enhancing the speed in which the Database Server stores, retrieves, and presents particular data records, the Server maintains one or more database indexes 245 on the table. A database index, typically maintained as a B-Tree data structure, allows the records of a table to be organized in many different ways, depending on a particular user's needs. An index may be constructed as a single disk file storing index key values together with unique record numbers. The former is a data quantity composed of one or more fields from a record; the values are used to arrange (logically) the database file records by some desired order (index expression). The latter are unique pointers or identifiers to the actual storage location of each record in the database file. Both are referred to internally by the system for locating and displaying records in a database file. As clients insert more and more data into a particular one of the table(s) 250, a corresponding one of the index(es) 245 continues to grow. Before describing the methods of the present invention for enhancing concurrency, it is helpful to examine further the general methodology for storing and indexing data records in a database system.

VI. Data Pages and Indexes

A. Data Pages and Page Chain

Figure 2B:
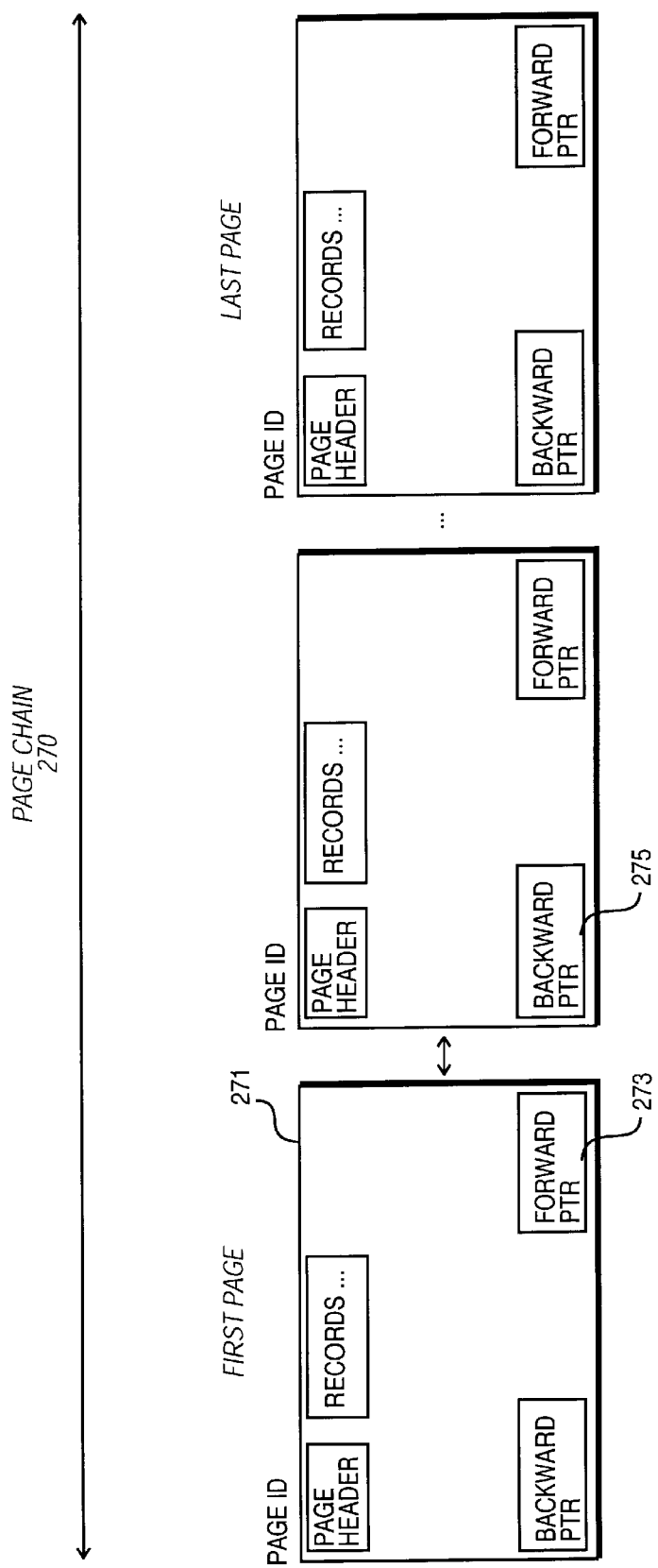
FIG. 2B is a block diagram illustrating a structure for storing data records, such as a "data page."

As shown in FIG. 2B, the data records or rows of a database table are actually stored in a particular structure known as a "data page." A data page may be viewed as a storage unit (e.g., 2K storage block) which holds one or more records, such as page 271. When a data page is "full," typically on the order of about 50 to 100 records, it is necessary to allocate a new data page. Every page which is allocated is linked to its previous and next neighboring pages via forward and backward page pointers (e.g., pointers 273, 275 ), so that logically a linked list or "chain" of pages exists. This forms the "page chain," such as the page chain 270 shown in FIG. 2B. Typically, identifiers or "Page IDs" for the first and last page of a page chain are maintained in a system catalog for the database.

Conventionally, only a single page chain is employed for a given object. A more advanced approach is to employ multiple page chains for a given object. Such an approach is described in commonly-owned, co-pending application Ser. No. 08/537,020, Database System with Methods for Partitioning an Object into Multiple Page Chains, filed Oct. 2, 1995, now U.S. Pat. No. 5,717,919, the disclosure of which is hereby incorporated by reference. It should be noted, however, that linking all data pages in a page chain is not required. Sybase Adaptive Server Enterprise™ (ASA 1192), for example, introduced new types of tables called "data only locked tables," in which data pages may not be linked in a page chain. A special data structure called object allocation map (OAM) is used to track data page IDs. If there is a need to scan all data pages, OAM is consulted.

B. Indexes

1. B-Trees

Locating a particular record or set of records by performing a sequential or linear scan from one end of a database table, comparing each record along the way, is an expensive operation. With such an approach, all of the blocks or pages of records would have to be visited until the record sought is finally located. For a table of even moderate size, such an approach yields unacceptable performance. As a result, virtually all modern-day relational database systems employ B-Tree indexes or a variant.

Figure 2C:
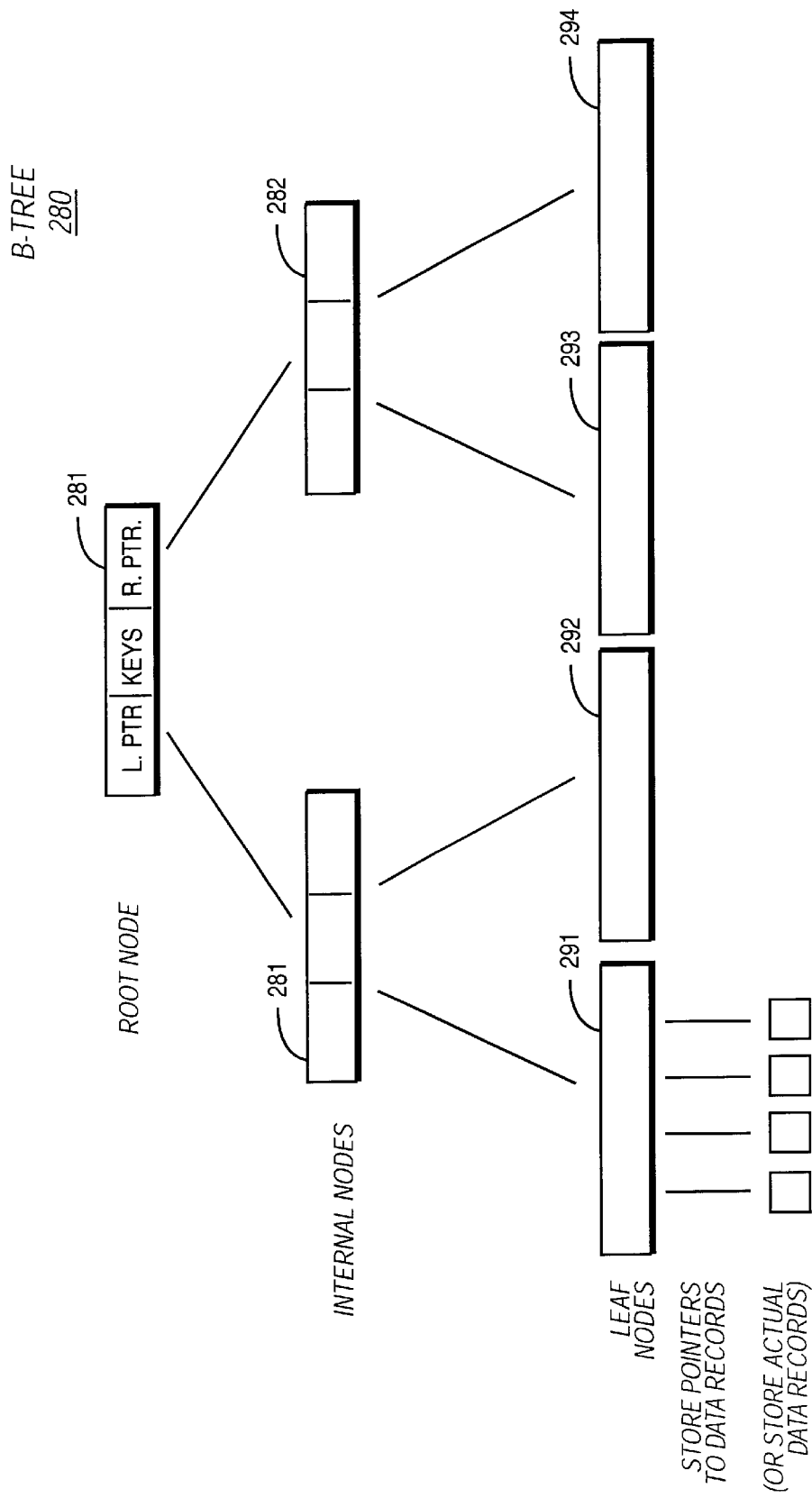
FIG. 2C is a block diagram illustrating a B-Tree storage structure.

FIG. 2C illustrates a simple B-Tree 280, which comprises a Root Node 281, Internal Nodes 281, 282, and Leaf (terminal) Nodes 291, 292, 293, 294. As shown, therefore, a B-Tree consists of a plurality of nodes arranged in a tree. Each node may, in turn, be thought of as a block of records. As shown by the Root Node 281, each node stores one or more key values ("keys") together with pointers to left and right children nodes (e.g., Nodes 281, 282 for Root Node 281).

Searching for a particular record with the help of a B-Tree occurs by traversing a particular path in the tree. To find a record with a particular key value, one would maneuver through the tree comparing key values stored at each node visited with the key value sought. The results of each comparison operation, in conjunction with the pointers stored with each node, indicate which path to take through the tree to reach the specific record desired. Ultimately, a search will end at a particular leaf node, such as leaf node 291. For a simple or "non-clustered" index, the leaf node will, in turn, point to (i.e., store a pointer to or identifier for) a particular data record for the key value sought.

For a "clustered index," on the other hand, the actual data of the data records are stored on the leaf nodes themselves. In other words, a clustered index is one in which the data of the table (i.e., data pages) are put directly on the leaf-level nodes of the B-Tree. This is in contrast to the abovementioned non-clustered index where the leaf nodes store only pointers to the actual data pages (which, because of their large size, are generally loaded as a heap, as needed). Present-day examples of systems employing clustered indexes include, for instance, Sybase Adaptive Server™ from Sybase, Inc. of Emeryville, Calif. Typically, such systems employ clustered indexes in addition to, not in lieu of, non-clustered indexes.

General techniques for the construction and operation of B-Trees are well documented in the technical, trade, and patent literature. For a general description, see Sedgewick, R., *Algorithms in C*, Addison-Wesley, 1990. For a description of B-Tree indexes implemented in a PC DBMS system, see Baker, M., *B-tree indexing: A look at indexing tradeoffs in dBASE, Clipper, and FoxPro*, Programmer's Journal, Vol. 8.6, November/December 1990, pp. 42–46. Also, see System and Methods for Information Retrieval, International Application No. PCT/US91/07260, International Publication No. WO 92/06440, Apr. 16, 1992, which describes B-Tree indexes for Fox® PC DBMS software. Multiple index files, including dBASE's .mdx files, have also been described in the technical literature; see e.g., Freeland, R., *Exploring MDXs*, Data Based Advisor, February 1991, pp. 85–87. The disclosures of each of the foregoing references are hereby incorporated by reference.

2. B-Tree Maintenance

Maintenance of B-Trees is fundamental to the operation of indexes in a database system. As new data records are loaded in a database table, the index (and corresponding in-memory B-Tree) for that table grows, to accommodate the new records. As a new record is added to a table, a corresponding index entry (typically, index key value plus record identifier) is added to an appropriate slot in the appropriate B-Tree node (i.e., the node which is appropriate for the key value expressed by the record). Since the nodes of the B-Tree have a finite size (generally, limited by the size of the database page employed), when an update operation occurs which exceeds the capacity of a particular node, an "overflow" condition exists at the node.

A node overflow is handled by splitting the particular node into two parts, for storing the new information (i.e., for storing the additional key value/record identifier for the new data which is being added). For data insert or update operations which are random, splitting the node "down the middle" yields good, and often optimal, results. For non-random ones, splitting can be optimized based on the particular load pattern of the update. Such as approach is described in commonly-owned, co-pending application Ser. No. 08/497,663, Database System with Improved Methods for B-Tree Maintenance, filed Jun. 28, 1995, now U.S. Pat. No. 5,644,763, the disclosure of which is hereby incorporated by reference. Similar to a B-Tree node or page, a data page may overflow. In a corresponding manner, the data page may be split into two (or more) separate pages for accommodating the new data.

VI. Improved Methodology for Enhancing Concurrency

A. Introduction

Concurrency provided by a database system is highly dependent on the criterion used for blocking. All other things being equal, the more the number of rows on which a scan needs to block, the less the concurrency. Consider a scan which needs to process a set s of rows of which only a subset, say q rows (where q is much smaller than s), qualifies the scan criterion. For example, take a scan on an EMPLOYEE table that is looking for employees with age>45 and salary<60K. If no index has age or salary (i.e., as indexed columns), every row in table needs to be examined even though only a few rows may qualify. Even when an index exists, if the index includes age or salary but not both, many index rows may qualify but only a few of them may satisfy both criteria.

If the scan attempts to lock each row in the set s, less concurrency results, as well as increased locking overhead. For example, a table scan would have to examine every row in the table and so every row may have to be locked. On the other hand, if the scan locks only the rows in set q, it may violate isolation-level semantics (i.e., that transactions are atomic) by causing result sets of scans to be affected by transactions which have aborted. When a transaction aborts, all its changes must be undone; the system must also ensure that it has not affected the results of other transactions running at read-committed or higher isolation levels.

Accordingly, the present invention introduces a computer-implemented methodology for using a "row update" (ROW_UPDATE) bit and deferred locking techniques that reduce locking overhead and increase concurrency. These techniques provide a particular performance advantage over systems that employ row-level locking.

B. Design

1. Data only Locking

The present invention employs "data only locking" in which no logical locks are acquired on index pages. Two types of data only locking are provided: data row locking and data page locking. In data row locking, to lock a data row, the row identifier or rowid (RID) is used as a lock handle. RID consists of the system's page# (page number) and row# (row number) for the row. Index rows are of the form (key value, RID) where RID is the data row being pointed to by the index row. To lock an index key, the RID of the underlying data row is used as lock handle. Thus, the lock handle is always data rowid. Data page locking, on the other hand, is the same as data row locking except that the lock handle includes just the page# (i.e., row# is omitted). For clarity of description, the following discussion will focus on data row locking. Those skilled in the art, however, will appreciate that the description is easily extended to data page locking.

Additionally, since RID is used as a handle to lock in data only locking, the RID of a data row is kept invariant by the system for the life of the row. However, an exception is made for a reorganization utility which gets an EXCLUSIVE table lock and reorganizes the table possibly moving several rows and changing their RIDs.

2. Locking and Latching

"Latches" are a mechanism used to guarantee physical consistency of pages. For example, a transaction modifying a page holds an exclusive (EXCLUSIVE or EX) latch on the page, while a transaction reading a page holds a shared (SHARED or SH) latch; the reader is protected from seeing a physically inconsistent page. Thus, readers access pages under a SHARED latch and writers access pages under an EXCLUSIVE latch. Latches are held for a short-duration. For example, a latch is held only for the duration of modification of a page or duration of read (operation) from the page; they are not held for the duration of the transaction. Latches are held only on "kept" pages (i.e., pages that are guaranteed by the database system's buffer manager to not be replaced from the buffer cache), with the latch information being kept in the buffer header of the corresponding page. By keeping the information in the buffer header, the system can perform latching and unlatching more efficiently than locking and unlocking. In a no-contention case, latching is approximately ten times faster than locking. Since there is no deadlock detection performed on latches in a preferred embodiment, they must be acquired in a predetermined order and/or no-wait mode.

Locks are acquired for logical consistency—that is, to achieve "recoverability" and to achieve the semantics required by the isolation level at which the transaction is running. The ROW_UPDATE (bit) and deferred locking optimizations are generally not applicable for serializability and dirty reads isolation levels and so those isolation levels are not discussed here. Read committed and repeatable read isolation levels lock the same rows but differ in the duration of locks. In the latter case, the lock is released only when the transaction completes, while in the former case, a SHARED lock on a row can and is released once that row has been processed. (Note that if a row is inserted, deleted, or updated at any isolation level, an EXCLUSIVE lock is to be acquired on it and the lock has to be held until the end of transaction for recoverability reasons). The following discusses acquisition of locks, i.e., what rows are locked. Unless otherwise specified, it is assumed that a SHARED lock acquired at read committed isolation level is released as soon as the processing of that row has finished, while all locks acquired at repeatable read isolation level and exclusive locks acquired at read committed isolation level are released at the end of transaction.

When a lock is requested, three cases are possible:

(A) Same transaction is already holding a sufficient lock (e.g., it may have read or updated the same row in some earlier statement). In this case it is assumed that the Lock Manager grants the lock and returns LOCK_NOTNEEDED status.
(B) Another transaction is holding a conflicting lock. In this case, if it is an unconditional lock request, the transaction has to wait (e.g., sleep on the lock) for the other transaction to release the lock. The task is awakened when the lock can be granted and the Lock Manager returns LOCK_GRANTED status. On the other hand, if the request is a conditional lock request, the Lock Manager returns LOCK_DIDNTQUEUE status and does not grant the lock.
(C) No transaction is holding a conflicting lock and the transaction requesting the lock is not already holding a sufficient lock. In the case, the Lock Manager grants the lock and it returns LOCK_GRANTED status.

It is also assumed that the Lock Manager can support instant duration lock requests. When an instant duration lock is requested, the Lock Manager returns LOCK_NOTNEEDED, LOCK_GRANTED or LOCK_DIDNTQUEUE in the same way as explained above. However, as the name indicates, the lock is held only for an instant duration, i.e., it is released even before the call to Lock Manager returns.

3. Lock Manager, Latch Manager, Access Methods and Query Processing Layer(s)

The "Lock Manager" is employed for providing interfaces for acquiring and releasing conditional and unconditional locks. In an analogous manner, a "Latch Manager" is employed to provide interfaces for acquiring and releasing conditional and unconditional latches. The Access Methods (module) calls the Lock Manager/Latch Manager to acquire and release locks and latches. Access Methods, as previously described, provides interfaces functions, such as performing a single table scan or an index scan and inserting a single row, deleting a single row specified by RID, and updating a row specified by RID given its new image, and the like. Access Methods employ an "Index Manager" which manages indices and a "Data Layer" (module) which manages data pages. A "Query Processing Layer" sits on top of Access Methods. It is responsible for splitting complex SQL statements into simpler operations that can be handled by the Access Methods.

4. Latching Protocols

As previously noted, deadlock detection is not performed on latches. Accordingly, the Latch Manager does not do deadlock detection and so callers to the Latch Manager are responsible for ensuring that they do not get into a latch deadlock or a mixed lock/latch deadlock situations. Accordingly, three constraints are imposed:
1) While holding a latch, only conditional locks can be requested. If the conditional lock cannot be granted by the Lock Manager, the latch is released and an unconditional lock is requested. This is used to prevent deadlocks involving both locks and latches.
2) Latches are released by the Access Methods before returning control to the Query Processing Layer. This is because the Query Processing Layer may perform joins, subqueries, or the like with the row returned by the Access Methods and it is hard to ensure a deadlock free operation. Also, latches are not intended to be held for such a long period.
3) Latches are released by the Index Manager before returning control to the Data Layer. This is to avoid latching a data page while holding a latch on the corresponding index page. Also, this allows better modularity by keeping the Data Layer and the Index Manager separate.

5. ROW_UPDATE and ROW_DELETE Status Bits (Each Data Row)

Each data row employs ROW_DELETE and ROW_UPDATE status bits (flags or indicators). When a transaction updates a row, it sets the ROW_UPDATE bit. When a transaction inserts a row, neither the ROW_UPDATE nor the ROW_DELETE status bits are set. When a transaction deletes a row, it sets the ROW_DELETE bit but the contents of the data row are left intact. Note that if a row gets updated and then deleted, it will have both its ROW_UPDATE and ROW_DELETE status bits set. When an insert (operation) rolls back, it sets the ROW_DELETE bit. When a delete rolls back, it clears the ROW_DELETE bit. When an update (operation) rolls back, it restores the old image of the row, and thus the row gets whatever status bits that exist in the old image.

The ROW_UPDATE and ROW_DELETE bits are cleaned up as follows. When a scan requests a lock on a row with ROW_UPDATE bit set and gets LOCK_GRANTED status from the Lock Manager, it means that the transaction which set the ROW_UPDATE bit has completed and so the ROW_UPDATE bit can be cleared. Similarly a row with ROW_DELETE bit set can be removed from the page if it is determined that the deleting transaction has completed.

6. Status Bits in Index Rows

Each index row employs a ROW_DELETE bit but no ROW_UPDATE bit. Update of an index row is always done as a delete followed by insert because the position in the index may change when the key value is updated. Accordingly, there is no need to have a ROW_UPDATE bit in index rows.

7. Scans

SARGS are scan arguments or predicates that are simple enough to be expressed in the form:

colid operator value where colid (column ID) specifies a particular column on which qualification condition needs to be applied. Here, operator is one of LT (less than), GT (greater than), EQ (equal to), NE (not equal to), LE (less than or equal to), GE (greater than or equal to), and value is a constant of the same data type as the column referred to by colid. For instance, salary<50K is a SARG but not (salary*3<50K). All scan predicates that can be expressed in the form of SARGS can be filtered by the Access Methods. Other complex predicates are filtered by Query Processing (module). Query Processing calls the Access Methods to perform a table scan or an index scan with an optional conjunct of SARGS. It returns only those rows that satisfy ALL SARGS.

8. Table Scans

Figure 3A:
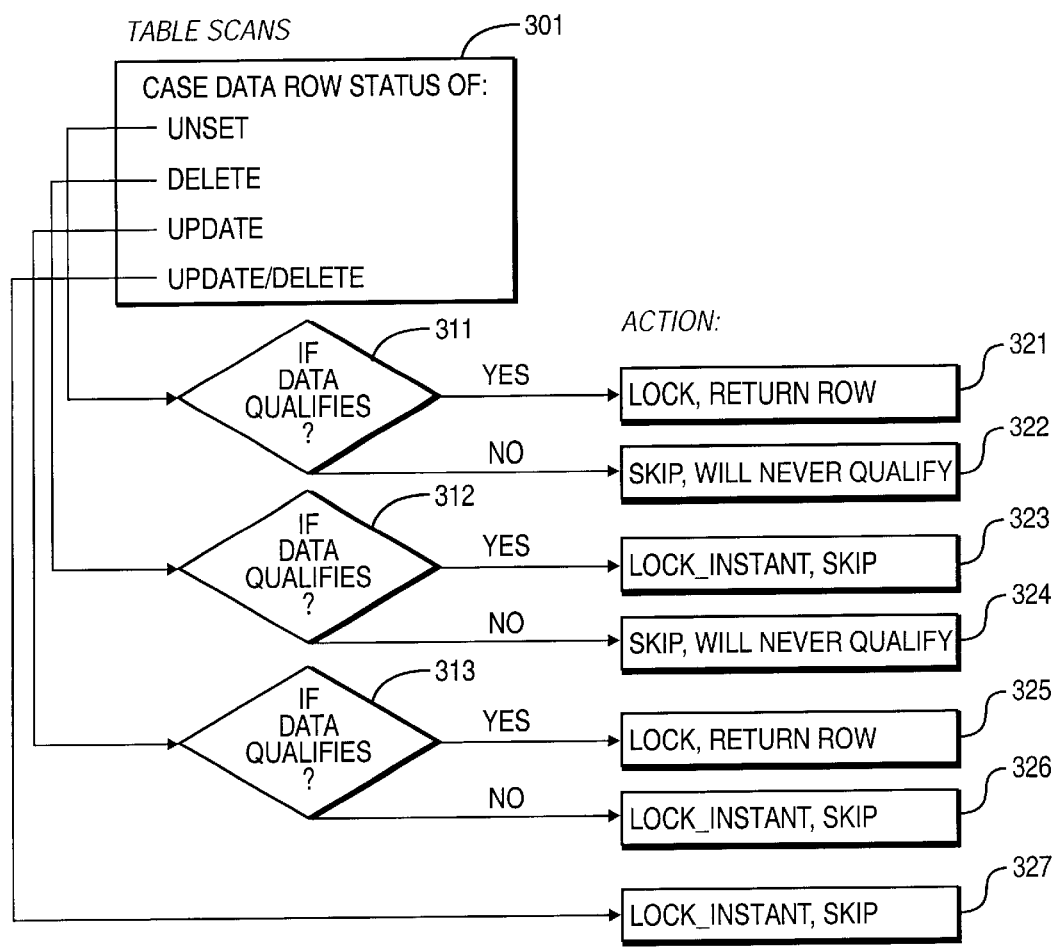
FIG. 3A is a flowchart of a method of the present invention that is adopted for table scans.

FIG. 3A is a flowchart of a method 300 illustrating the basic approach adopted for table scans. Here, the action taken by a scan depends on whether the row qualifies and the status of the row status bits. Qualification is done while holding a latch. At step 301, the method examines the status (bits) of the data row under consideration (for locking). Four possible combinations exist: unset, delete, update, and update/delete. In the case that the status bits are not set (i.e., "unset"), the method proceeds to step 311 for determining whether the data qualifies (i.e., the scan criterion). If the data qualifies ("yes" case), the method proceeds to grant the lock (request) and return the data row, as indicated by step 321. If, however, the data does not qualify ("no" case), the row is instead skipped, as the row will never qualify, as indicated by step 322.

In the case that the status is "delete" (i.e., only the "delete" status bit is set), the method proceeds to step 312 for determining whether the data qualifies. If the data qualifies, the method proceeds to process a request for an instant duration lock ("lock instant"). The instant duration lock is a mechanism that allows the client (requesting the lock) to see whether there exists a conflicting lock already held on the row (i.e., from another concurrent transaction). If no conflict is found, the "lock instant" request will be granted and the client will know that the "delete" has committed. Accordingly, the row may be skipped as the row is "deleted" (and that deletion has been committed). If a conflicting lock exists, however, the "lock instant" request will fail. Here, it is possible that the "delete" may in fact roll back (as a result of the roll back of another concurrent transaction). Accordingly, the client will instead block (i.e., sleep on the lock—a waiting for the lock to be granted) so that a rollback of the "delete" may be detected. On the other and, if the data does not qualify ("no" case at step 312 ), the method may proceed to skip the row as it will never qualify (even if the "delete" rolls back), as indicated by step 324.

In the case that the status is "update" (i.e., only the "update" status bit is set), the method proceeds to step 313 for determining whether the data qualifies. If the data qualifies ("yes"), the method proceeds to grant the lock and return the row, as indicated by step 325. If the data does not qualify ("no" case), then a instant duration lock is requested, as indicated at step 326. As was previously discussed above for step 323, the "lock instant" request serves as a shortcut method for determining whether the "update" has committed and, if not, for sleeping on the lock until the lock may be granted. If the "update" has committed (i.e., the "lock instant" request can be granted), the row is skipped (since, recall, the data does not qualify the scan criterion). Finally, it is possible that both "update" and "delete" (i.e., both the "update" and "delete" status bits) are set. Regardless of whether the data qualifies, the method will process a "lock instant" request/skip action, in a manner similar to that previously described. This is illustrated at step 327.

The basic action taken by the method may be summarized as follows.

TABLE 1

Table Scan Actions

| Data Row Status | Data Qualifies | Action |
| --- | --- | --- |
| Unset* | Yes | LOCK, return row |
| Unset | No | Skip - will never qualify |
| Delete | Yes | LOCK_INSTANT, skip (block if lock cannot be granted because delete may roll back) |

TABLE 1-continued

Table Scan Actions

| Data Row Status | Data Qualifies | Action |
| --- | --- | --- |
| Delete | No | skip - will never qualify |
| Update | Yes | LOCK, return row |
| Update | No | LOCK_INSTANT, skip (block if lock cannot be granted because update may roll back and original Content may qualify) |
| Update/delete | Yes | LOCK_INSTANT, skip (block if lock cannot be granted because delete may roll back) |
| Update/delete | No | LOCK_INSTANT, skip (block if lock cannot be granted because update/delete may roll back and original row may qualify) |

(*Note: an uncommitted row with no DML (data manipulation language) bits set represents an uncommitted insert.)

Note that LOCK_INSTANT means that an instant duration lock is required. In both LOCK as well as LOCK_INSTANT cases, first a conditional lock is requested and if that fails, the page time-stamp is noted, the latch is dropped and an unconditional lock is requested. After wakeup from lock sleep, the latch is required and the page time-stamp is checked. If the page has changed since the latch was dropped, the lock is released and the row needs to be qualified again. Otherwise, the scan continues just as in the case where the conditional lock request was successful. Also, after the lock is acquired, if the Lock Manager returns LOCK_GRANTED, to indicate that no one is holding a lock and so the ROW_UPDATE bit can be cleared. This is because the row is no longer an uncommitted update. On the other hand, if the Lock Manager returns LOCK_NOTNEEDED, it means that the same transaction is holding a lock on the row and hence it could be an uncommitted update of the same transaction. In this case the ROW_UPDATE bit is not cleared.

9. Advantages of the ROW_UPDATE Bit

If a row does not qualify and does not have its ROW_UPDATE bit set, it is skipped. The rationale behind this is that, since ROW_UPDATE is not set, the row cannot be an uncommitted update. So either it is uncommitted insert or uncommitted delete or the row is committed; i.e., any transaction which has modified the row (either inserted/updated/deleted it) has committed. There is no reason to wait for a lock on uncommitted insert or uncommitted delete that does not qualify scan criterion because regardless of whether the inserting/deleting transaction rollsback, the row will not qualify anyway.

On the other hand, without the ROW_UPDATE bit, it may not be possible to determine if the row is an uncommitted insert or uncommitted update. Even if the row does not qualify, it is possible that some other transaction T has updated the row and the old image of the row may qualify the scan criterion (e.g., when the row is skipped and T rolls back). In such a case, the result set of scan was affected because of aborted transaction T, which violates the semantics of read committed isolation level.

C. Index Scans and Deferred Locking

1. General

During index scans, SARGS need not necessarily be on index columns only. For example, consider an EMPLOYEE table that has four columns: name, age, salary and address. Suppose that there is a non-clustered index I on age. Consider the following query:

> select *from employee where age>40 and salary<50K

In this case, if the index I is used to do scan, one SARG is on index column and one SARG is on a column, not in the index.

During index scans, the Index Manager returns RIDs from those index rows for which the index key value qualifies. In the above example, the Index Manager would return to the Data Layer the RIDs from all index rows for which age>40. The Data Layer, in response, retrieves the data row using the RID and checks if the row qualifies the SARGS on the non-index column. In the above example, the Data Layer would filter out the data rows which do not satisfy salary<50K.

Many systems employ an Index Manager that locks the RID before returning to the Data Layer. This may cause unnecessary locking/blocking when there are SARGS on non-index columns. For instance, if some other transaction T has inserted an employee Tom who has salary of 55K and age of 45, the scan would block on a lock for Tom. It is not necessary to block because regardless of whether T commits or rolls back, the row would not qualify.

2. Deferred Locking

Deferred locking is a technique where the Index Manager returns record IDs (RIDs) to the Data Layer without acquiring locks on them during scans that have scan arguments (SARGS) on columns not in the index; the Data Layer subsequently qualifies the data row and determines whether locking is really necessary. Conventionally, in index scans, locking is done in the Index Manager (based only on whether the index row qualifies). However, in accordance with the present invention, the locking is done after reading the data row, taking into account the status bits of data row and whether the data row qualifies. This optimization is performed when there are some qualification conditions on columns but not in the index. In this manner, deferred locking reduces blocking in index scans which have SARGS on columns not in the index.

In operation, the Index Manager qualifies index rows. It qualifies both the rows with and without the ROW_DELETE bit set. Rows that do not satisfy SARGS on index columns are discarded. If a qualifying row does not have its ROW_DELETE bit set, the RID from it is returned to the Data Layer. On the other hand, if the qualifying row has its ROW_DELETE bit set, an instant lock is acquired on it to see if the deleting transaction has committed. If the lock is granted (i.e., Lock Manager returns LOCK_GRANTED or LOCK_NOTNEEDED), the row is discarded. Otherwise, RID from the row is returned to the Data Layer.

3. Updates/Delete/Inserts

Some race conditions are possible due to deferred locking. It is therefore important to understand the sequence of events during DML (data manipulation language, e.g., SQL) operations. During insert (operation) of a new row, the data row is inserted first and then index rows are inserted for each insert. During delete (operation) of a row, index rows are deleted from each index and then the data row is deleted. During update (operation) of a row, if the update is changing index columns, the index rows are deleted from each index affected by the update and then the data row is updated and the index rows are inserted into the affected indices. If none of the columns in an index are affected by the update, the index row for that index is left intact.

4. Race Conditions Due to Deferred Locking

(a) Need to Check Index Pages

The Index Manager unlatches the index page before returning the RID to the Data Layer. Given the RID, the Data Layer retrieves the data page and latches it. Before latching of the data page, it is possible that another transaction has modified the data row. For example, another transaction may have deleted the data row or updated it such that index columns no longer qualify the scan criterion.

Therefore, the following approach is adopted. After latching the data page, the Data Layer calls the Index Manager to check if the page time-stamp of the index page has changed since the RID was returned. Note that the Index Manager performs this check without acquiring a latch on the index page. This is to avoid latching the index page while holding a latch on the data page. (The latch is not needed on the index page to check the time-stamp because the time-stamp of a page is always at the same offset within the page and the Index Manager is interested only in checking if time-stamp has changed or not). If the time-stamp has changed, then the Index Manager is asked to restart. Suppose that the Index Manager had returned a RID of 10.4 from an index row that has key value=14. If the Data Layer asks the Index Manager to restart, the Index Manager tries to locate (14, 10.4) in the index. If it is found, it is qualified again. Otherwise, the Index Manager continues the scan at the next row (i.e., first key in the index that is larger than (14, 10.4)).

Note that when the Data Layer requests a lock on a data row, it is possible that it may have to wait for ("sleep" on) the lock (i.e., conditional lock request may fail and it may have to drop the latch and request an unconditional lock). After waking up from lock sleep, it latches the data page again and asks the Index Manager to see if index page time-stamp has changed. If yes, it drops the latch and asks the Index Manager to restart as explained before. If the index page time-stamp has not changed, then it checks to see if data page time-stamp has changed. If yes, then the data row is requalified and the decision of whether to lock is revisited (just as in table scan). If the data page time-stamp has not changed, the Data Layer can proceed as if conditional lock request has succeeded.

(b) Stale Deletes

As mentioned before, the Index Manager may return RIDs from deleted index rows. It is possible that these deletes have happened some time ago and the corresponding data page no longer belongs to the same table now (i.e., it may have been deallocated and allocated to a different table or index, or it may just be an unallocated page). Therefore, when the data page is read, it needs to be validated; i.e., it is checked to see if it is still a data page of the same table. If not, the RID is discarded and the Data Layer requests the Index Manager for the next qualifying row.

(c) Transient Index Inconsistencies

During DML operations, there is a "window" between updating a data page and updating an index and in which some inconsistencies are possible. For instance, an index row may have been marked as deleted but the data row may not yet have been marked as deleted. Qualification of data row must account for that, and will now be described.

5. Qualification of Data Rows by Data Layer

Figure 3B:
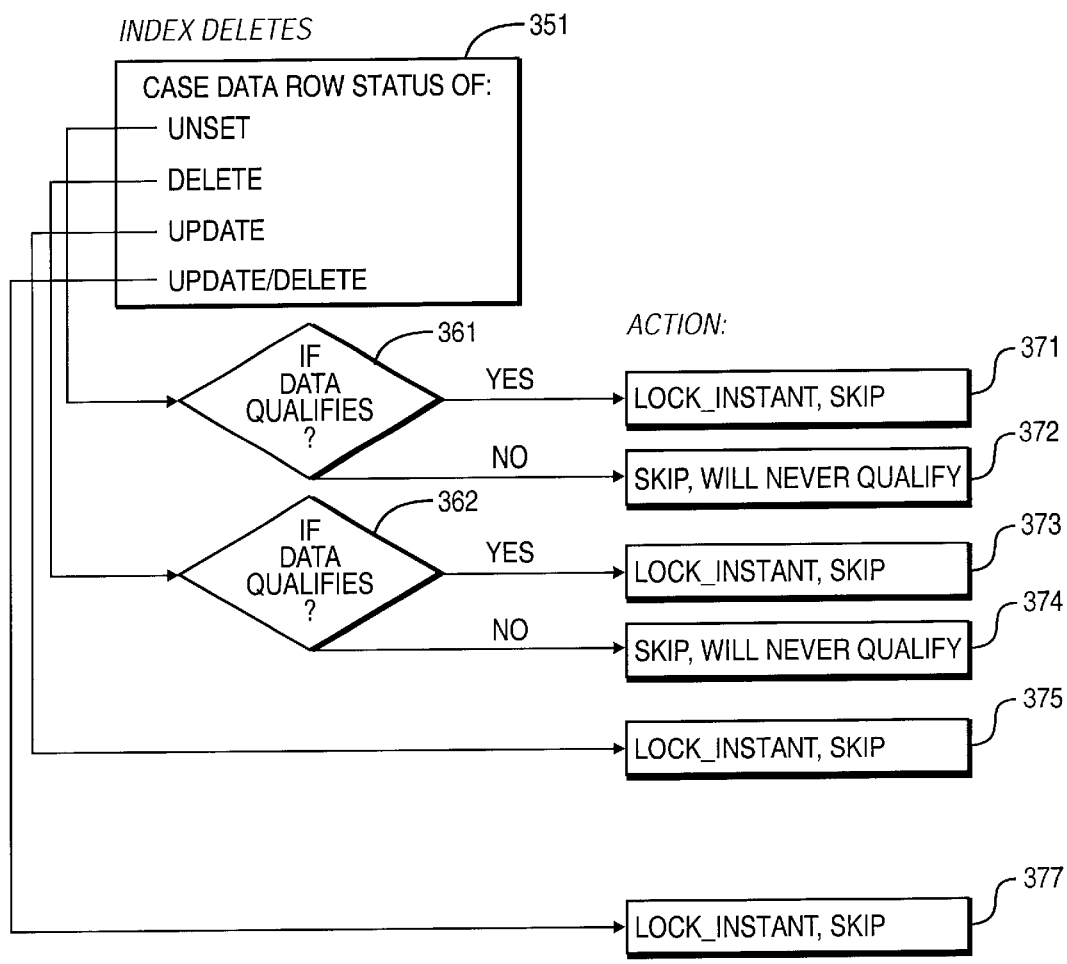
FIG. 3B is a flowchart of a method of the present invention that is adopted for qualifying data rows under the circumstance when an index row is a "delete" (i.e., its ROW_DELETE bit is set).

FIG. 3B is a flowchart of a method 350 illustrating the basic approach adopted for qualifying data rows under the circumstance when an index row is a "delete" (i.e., its ROW_DELETE bit is set). On the other hand, if the index key does not have its ROW_DELETE status set, the behavior is the same as for table scan.

At step 351, the method examines the status (bits) of the data row under consideration (for locking). As before, four possible combinations exist: unset, delete, update, and update/delete. In the case that the status bits are not set (i.e., "unset"), the method proceeds to step 361 for determining whether the data qualifies. If the data qualifies ("yes" case), the method will process a "lock instant" request/skip action, in a manner similar to that previously described, as illustrated by step 371. Otherwise, in a case where the data does not qualify ("no" case), the row is simply skipped, as the row will never qualify, as indicated by step 372.

In the case that the status is "delete" (i.e., only the "delete" status bit is set), the method proceeds to step 362 for determining whether the data qualifies. If the data qualifies, the method will process a "lock instant" request/skip action, as previously described. On the other and, if the data does not qualify ("no" case at step 362 ), the method may proceed to simply skip the row as it will never qualify (even if the "delete" rolls back), as indicated by step 374. In the remaining cases that the status is either "update" or "update/delete," the method will, regardless of whether the data qualifies, process a "lock instant" request/skip action, in a manner similar to that previously described. This is illustrated at step 375 for the "update" case and 377 for the "update/delete" case.

The basic action taken by the method may be summarized as follows.

TABLE 2

Scan Behavior Qualification of Index Deletes

| Data Row Status | Data Qualifies | Action |
| --- | --- | --- |
| Unset | Yes | LOCK_INSTANT, skip (block if lock cannot be granted because it may be an update in progress) |
| Unset | No | skip - will never qualify |
| Delete | Yes | LOCK_INSTANT, skip (block if lock cannot be granted because delete may roll back) |
| Delete | No | skip - will never qualify |
| Update | Yes | LOCK_INSTANT, skip (block if lock cannot be granted because update may roll back) |
| Update | No | LOCK_INSTANT, skip (block if lock cannot be granted because update may roll back) |
| Update/delete | Yes | LOCK_INSTANT, skip (block if lock cannot be granted because update may roll back) |
| Update/delete | No | LOCK_INSTANT, skip (block if lock cannot be granted because update may roll back) |

An Appendix containing source code listings in the C Programming Language providing additional description of the foregoing features of the present invention is appended to the abovementioned commonly-owned, co-pending application Ser. No. 09/364,981, which has previously been incorporated by reference.

Lock Manager Enhancement for Improving Concurrence

A. Introduction

1. Basic Problem

In database systems that do not have support for versioning, scan operations ("scans") block when encountering a row that has been updated by a concurrent transaction that has not yet committed. In systems that support versioning, a scan skips the row if the last committed image of the row does not satisfy the scan predicates. However, in systems that do not support versioning, it is not possible to retrieve the last committed version of the row. As a result, the scan blocks for the "updater" regardless of whether the row matches scan predicates or not. This results in a lot of unnecessary blocking in some applications, significantly reducing the concurrency. In accordance with the present invention, a Lock Manager enhancement is provided which reduces such unnecessary blocking of scans, thus giving enhanced system performance.

2. Latches, Locks, Corresponding Managers, and Related Operations

The following discussion of the methodology of the present invention assumes an understanding of database latches, locks, and their corresponding managers, as well as an understanding of row status bits and database scan operations (including "scan arguments" or sargs). All of these concepts are described above, see e.g., Sections VI. B. 1–2 (locking and latching, including data only locking), VI. B. 3 (Lock Manager, Latch Manager, Access Methods and Query Processing Layer(s)), VI. B. 4 (Latching protocols), VI. B. 5 (ROW_UPDATE and ROW_DELETE status bits), VI. B. 6 (Status bits in index rows), VI. B. 7 (Scans), and VI. B. 8 (Table scans).

3. Locking Enhancement to Improve Concurrency

The following describes the Lock Manager enhancement for improving concurrency. As mentioned before, ROW_UPDATE bit and deferred locking optimizations do not apply for dirty reads and serializability isolation levels. The same is true for this optimization. It applies to read committed and repeatable read isolation levels. ROW_UPDATE bits allow a scan to skip uncommitted inserts and uncommitted deletes that do not qualify but require a scan to block on uncommitted updates regardless of whether the row qualifies. To solve this problem, the columns that were updated are also tracked in the Lock Manager in addition to the exclusive lock on the data row (in case of data row locking) or data page (in case of data page locking).

4. A New Field lrcolumns in Lock Data Structure

A "lock record" or LOCKREC structure is used in the database system as the data structure to represent a lock. To this structure, a new 32-bit field, lrcolumns, is added to track which columns have been modified. The columns in a table are given column IDs when the table is created. These numbers range from 1 through n, where n is the number of columns in the table. Thus, information about update of columns with colid>32 is not tracked, in a preferred embodiment, but the embodiment may be modified to accommodate additional columns, if desired. The lrcolumns is only meaningful for an exclusive lock that was acquired to update one or more columns of a data row. Accordingly, if an exclusive lock was used only to insert or delete (but not update) the data row, the lrcolumns field in such a lock would be 0. Similarly, the lrcolumns field is 0 for locks that are not exclusive locks (e.g., shared locks).

An update statement in SQL can be used to update one table and the update statement specifies the columns of the table being updated in the statement. In Sybase Adaptive Server™ Enterprise (ASE), for instance, when the update statement is compiled, the list of columns being updated is stored in the data structure E_STMT which represents a compiled statement. At the compilation time, a bitmap of size 32 bits is initialized to track the column IDs (colid) of all the columns with colid<=32 that are being updated; this is stored in E_STMT as e_chgingcols (i.e., changing columns). When an exclusive lock is requested on a row of the table being updated in the update statement, the Lock Manager uses the following logic to set the value of lrcolumns.

```
if (X (exclusive) lock was already acquired on this row by
   this transaction)
{
/* This transaction already has an X lock on this row.
**It may already have updated some columns in this row, in
   which
**case lrcolumns has the bitmap for the column ids of the
   columns that
**were updated. Perform bitwise OR to set the bits corre-
   sponding to the
** positions of the columns whose column ids are in
   e_chgingcols.
*/
   lrcolumns=lrcolumns |||e_chgingcols from E_STMT
      structure of the statement being executed
}
else
{
/*
** This transaction did not update any columns of this row
   so far.
*/
   lrcolumns=e_chgingcols
}
```

5. Modifications to the Method of Handling Conditional Lock Requests

Suppose that a conditional lock is requested on an object (either a page or row) from the Lock Manager. Also, suppose that the Lock Manager finds that a conflicting lock is being held by a concurrent transaction. In such a case, the lock cannot, of course, be granted and, therefore, LOCK_DIDNTQUEUE status is returned by the Lock Manager. The Lock Manager needs to be enhanced, so that in addition to returning LOCK_DIDNTQUEUE status, the Lock Manager also returns a copy of the conflicting lock that it found. Note that there could be multiple conflicting locks. For example, if an exclusive lock is requested by transaction T1, the Lock Manager may find that transactions T2 and T3 are both holding shared locks on the same object. In this case, there are two conflicting locks.

However, note that only one transaction can be holding an exclusive lock on an object at a given time. So, even if there are multiple conflicting locks, at most one of them can be an exclusive lock. In the event that there are multiple conflicting locks, the Lock Manager needs to return a copy of the conflicting exclusive lock, if one exists. If none of the conflicting locks is an exclusive lock (i.e., all are either shared or update locks), then the Lock Manager is free to return a copy of any of them.

6. How Scans Use the Information About Updated Columns

How table scans and index scans use the ROW_UPDATE bit has been previously described. Consider Table 1 above, for instance, which shows that a scan operation ("scan") requests an instant duration lock when the data row does not qualify and the data row has ROW_UPDATE (or both ROW_UPDATE and ROW_DELETE) status bit set. If the lock cannot be granted, the scan blocks for the lock. With the Lock Manager enhancement of storing information about updated columns, scan skips the row (i.e., does not block for a lock on the row) if at least one of the sargs that the row does not qualify is on a column that was not updated by the updater.

The following logic determines if the row can be skipped without blocking and it is executed when conditional lock request fails.

```
if row has ROW_UPDATE bit set and did not qualify then
{
   1=conflicting lock returned by the lock manager
/* Requalify the row but consider ONLY sargs on columns
   that were not
** updated by the updater(i.e., a sarg on column x is not
   considered if
** column id for column x is greater than 32 or if the bit
   corresponding
** the column id is set in lrcolumns).
*/
   for each sarg s of the scan
   {
      id=column id of the column referred in the sarg s
      if (id<=32) and (bit position corresponding to id is not
         set in
      lrcolumns)
      {
      /* it is certain that the column involved in this sarg was
         not
      ** updated by the updater
      */
         if the row does not satisfy this sarg
         {
         /* if we come here, there is no need to block. move on to
            next row
         */
            goto next_row
         }
      }
      else
      {
      /*
      ** This column may have been updated by the updater. So
         the
      ** requalification does not consider this sarg (i.e., it behaves
         as if this
      sarg does not exist).
      */
      }
   }
}
/* if we come here, block */
/* . . . code for blocking . . . */
```

Now consider Table 2 above, which shows that when the data row has ROW_UPDATE (or both ROW_UPDATE and ROW_DELETE) status bit set, a scan requests an instant duration lock and if the lock cannot be granted, the scan blocks for the lock. With the Lock Manager enhancement of storing information about updated columns, the behavior is the same if the row qualifies (i.e., if it satisfies all sargs). However, the scan skips the row (i.e., does not block for a lock on the row) if at least one of the sargs that did not qualify is on a column that was not updated by the updater. The same logic as shown above can be used to determine if it is necessary to block when a conditional lock request fails.

7. Extension of the Blocking Optimization

As described above, the Lock Manager enhancement can be used to reduce blocking of scans on rows that do not qualify at read committed and repeatable read isolation levels. Our assumption has been that at read committed isolation level, a lock is held on the current row of scan until the scan moves to the next row. However, the "read committed" isolation level only requires that the scan read committed data but does not require that the scan hold a lock on the row that is currently positioned on. Sybase ASE, for instance, includes a configuration parameter that allows user to choose avariation of "read committed" isolation that does not require scan tobe holding lock on the row that it is currently positioned on. This relaxation is not done for cursors that are not read-only. Note that some other RDBMSs also provide this variation.

In this variation, scan makes a conditional instant duartion lock request only to check if the row is committed (i.e., to check that there is no concurrent transaction that has modified the row but has not committed yet). This lock request is made while holding the latch. If the lock is granted, the row (or just the needed columns) is copied and the page is unlatched. However, if the lock is not granted, the scan unlatches the page and blocks for the lock. When this variation of "read committed" isolation level is used, the optimization can be enhanced to provide the benefits of column level locking with respect to read-write conflicts. However, the behavior will continue to be like row level locking with respect to write-writeconflicts. The enhancement is simple and is described below. The following description focuses on data row locking, but the underlying approach is applicable to improving the concurrency provided by data page locking as well.

1. When a data row is inserted, an exclusive lock needs to be acquired on the row. When the exclusive lock is requested, the Lock Manager is also requested to mark the lock with a special status bit, the LOCK_DATAINS status bit.

2. The following enhancement, implemented in the scan logic, is executed when a conditional lock request fails:

```
if the row qualifies
{
    l=conflicting lock returned by the lock manager
    if l has LOCK_DATAINS bit set,
    {
        /* It is an uncommitted insert. There is no need to
        ** block. It is ok to skip it.
        */
        SKIP the row.
    }
    /*
    ** Note that a column is of interest to the scan if the column
    ** participates in one of the sargs OR if that column is
    ** needed in the output of the scan.
    */
    if ((row has ROW_UPDATE bit set) AND
        (row does not have ROW_DELETE bit set) AND
        (the scan is not interested in any of the columns that
            were updated by the updater) AND
        (the scan is not interested in columns with colID>32 for
            which update information is not available)
    {
        /*
        ** scan is interested only in those columns that
        ** were not updated i.e the committed columns only.
        */
        copy the columns needed from the row
        unlatch the page
        RETURN the copied columns in the result set
    }
}
```

Thus this enhancement allows the scan to return uncommitted updates, instead of blocking on them; if none of the columns of interest were updated, this approach skips uncommitted inserts, instead of blocking on them.

While the invention is described in some detail with specific reference to a single preferred embodiment and certain alternatives, there is no intent to limit the invention to that particular embodiment or those specific alternatives. Thus, the true scope of the present invention is not limited to any one of the foregoing exemplary embodiments but is instead defined by the appended claims.

What is claimed is:

1. In a database system having a database storing a database table comprising a plurality of data rows, said rows storing information organized into particular database fields, an improved method for scanning a table for particular rows that meet a specified scan criterion, the method comprising:

providing each row of the database table with delete and update status flags for indicating which rows may be skipped during the table scan, wherein:
(i) the update status flag for a row is set when a transaction updates the row and is cleared when the transaction commits,
(ii) the delete status flag for a row is set when a transaction deletes a row and is cleared when the transaction rolls back, and
(iii) both the update and delete status flags for a row are restored to their respective prior states when a transaction rolls back that had flagged the row as updated;

tracking column status information for indicating columns that have been modified for a table being updated;

based on said status flags and said column status information, determining those rows of the database table that may be skipped during the table scan; and scanning the database table for rows that meet said specified scan criterion without blocking rows that are determined to be rows that may be skipped.

2. The method of claim 1, wherein during the table scan:
the scan includes at least one scan argument specifying which rows qualify the scan, and wherein the scan skips a row if at least one scan argument that the row does not qualify is on a column that is not being updated by a concurrently-executing transaction.

3. The method of claim 1, wherein said database system includes a lock data structure for tracking locks used to block access to rows, and wherein said lock data structure includes said column status information.

4. The method of claim 3, wherein said column status information comprises a multi-bit field, with each bit representing a particular column that has been modified for a table being updated.

5. The method of claim 4, wherein said multi-bit field comprises a 32-bit field.

6. The method of claim 1, wherein said method is restricted for use in read committed and repeatable read isolation levels.

7. The method of claim 1, wherein said update status flag allows a scan to skip uncommitted inserts and uncommitted deletes that do not qualify the scan criterion.

8. The method of claim 7, wherein said column status information allows a scan to skip uncommitted updates that do not qualify the scan criterion.

9. The method of claim 1, wherein said scan criterion comprises one or more scan arguments, and wherein a row may be skipped if at least one of the scan arguments that the row does not qualify is on a column that has not been modified for a table being updated.

10. The method of claim 1, wherein said scanning step includes:
if neither one of the status flags for a particular row have been set, skipping the particular row if the particular row fails to qualify the specified scan criterion.

11. The method of claim 10, wherein the particular row is skipped regardless of whether there exists another concurrently pending transaction in the system that might roll back.

12. The method of claim 1, wherein said scanning step includes:
if the delete status flag for a particular row has been set, skipping the particular row if the row is not blocked by another concurrent transaction.

13. The method of claim 1, wherein said scanning step includes:
if the delete status flag for a particular row has been set, skipping the particular row if the particular row fails to qualify the specified scan criterion.

14. The method of claim 13, wherein the particular row is skipped regardless of whether the particular row is blocked by another concurrent transaction.

15. The method of claim 1, wherein said scanning step includes:
if the update status flag for a particular row has been set, skipping the particular row if the particular row fails to qualify the specified scan criterion and the particular row is not blocked by another concurrent transaction.

16. The method of claim 1, wherein said scanning step includes:
if both of the status flags for a particular row have been set, skipping the particular row if the particular row is not blocked by another concurrent transaction.

17. The method of claim 1, wherein said scanning step includes:
if the delete status flag has been set for a particular row that does not meet the specified scan criterion but the particular row is blocked by another concurrent transaction, waiting for the concurrent transaction to commit or roll back.

18. The method of claim 17, further comprising:
if the concurrent transaction rolls back, clearing the delete status flag.

19. The method of claim 17, further comprising:
if the concurrent transaction commits, skipping the particular row.

20. The method of claim 1, wherein the delete status flag comprises a "row delete" status bit.

21. The method of claim 1, wherein the update status flag comprises a "row update" status bit.

22. The method of claim 1, wherein the update status flag of a particular row is set by a transaction that inserted the particular row into the database table.

23. The method of claim 22, wherein the delete status flag of the particular row is set if the transaction that inserted the particular row into the database table rolls back.

24. The method of claim 1, wherein said specified scan criterion is based, at least in part, on a database query.

25. The method of claim 24, wherein said database query comprises a data manipulation language (DML) statement.

26. A database system having a database storing a database table comprising a plurality of data records, said data records storing information organized into particular database fields, comprising:
a server connect to a client;
computer-implemented program logic for transmitting from the client to the server a query specifying a particular database transaction affecting data records of the database table, each data record being associated with delete and update status flags for indicating which records are to be deleted or updated, respectively, by another transaction that is concurrently executing;
computer-implemented program logic for tracking column status information for indicating columns that have been modified for a table being updated;
computer-implemented program logic for determining, based on said status flags, said column status information, and conformance to said query, which records of the database table need to be blocked from access by other transactions, during execution of the particular database transaction; and
computer-implemented program logic for blocking only those particular records of the database table which been determined to be records that need to the blocked.

27. The system of claim 26, wherein:
(i) the update status flag for a record is set when a transaction updates the record and is cleared when the transaction commits,
(ii) the delete status flag for a record is set when a transaction deletes a record and is cleared when the transaction rolls back, and
(iii) both the update and delete status flags for a record are restored to their respective prior states when a transaction rolls back that had flagged the record as updated.

28. The system of claim 26, wherein said computer-implemented program logic for blocking access provides access to a particular record when the particular record conforms to the query and neither one of the status flags for the particular record have been set.

29. The system of claim 26, wherein said computer-implemented program logic for blocking access does not block a particular record when neither one of the status flags for the particular record have been set and the particular record fails to conform to the query.

30. The system of claim 26, wherein said query comprises one or more scan arguments, and wherein said computer-implemented program logic for blocking access does not block a particular record that may be skipped as a result of at least one of the scan arguments that the record does not qualify is on a column that has not been modified for a table being updated.

* * * * *